United States Patent [19]

Cadaret

[11] 4,244,631
[45] Jan. 13, 1981

[54] HUB AND BEARING ASSEMBLY

[75] Inventor: Patrick M. Cadaret, Union Lake, Mich.

[73] Assignee: Rockwell International Corporation, Pittsburgh, Pa.

[21] Appl. No.: 83,082

[22] Filed: Oct. 9, 1979

[51] Int. Cl.³ ............................................. F16C 35/073
[52] U.S. Cl. ...................................... 308/210; 308/244
[58] Field of Search ............... 308/210, 244, 226, 225, 308/211, 207 R, 189 R, 106

[56] References Cited

U.S. PATENT DOCUMENTS

| | | | |
|---|---|---|---|
| 3,156,506 | 11/1964 | Scheifele | 308/211 |
| 3,765,737 | 10/1973 | Hatch | 308/211 |
| 4,085,984 | 4/1978 | Cameron | 308/207 A |

*Primary Examiner*—Lenard A. Footland

[57] ABSTRACT

A bearing spacer for a wheel assembly which has a hub rotatable about a spindle. The hub has a bearing stop shoulder projecting radially inwardly from an inner circumferential surface of the hub. A bearing is mounted on an outer circumferential surface of the spindle and the bearing spacer is mounted intermediate the stop shoulder and the bearing. The bearing spacer is comprised of an annular member having axially extending inner and outer cylindrical surfaces and radially extending end surfaces. One of the end surfaces extends radially outward from the inner cylindrical surface a radial distance less than the radial extent of the stop shoulder. This end surface is joined to the upper cylindrical surface of the bearing spacer by a surface spaced from the stop shoulder and the inner circumferential surface of the hub. Consequently, the bearing spacer transmits thrust forces from the bearing to the bearing stop shoulder while allowing a large radius on the bearing stop shoulder to reduce undesirable stress concentrations therein.

3 Claims, 3 Drawing Figures

HUB AND BEARING ASSEMBLY

BACKGROUND OF THE INVENTION

1. Field of the Invention

The present invention is directed to an improved wheel assembly of the type which includes a hub rotatable about a spindle, wherein the hub includes a bearing stop shoulder and, more specifically, a bearing spacer located between the hub and the spindle which is designed to reduce stress concentrations in the bearing stop shoulder area of the hub.

2. Description of the Prior Art

The prior art is best illustrated by U.S. Pat. Nos. 3,726,576 to Barnbrook et al issued Apr. 10, 1973; 3,515,448 to C. W. Williams et al issued June 2, 1970; 3,765,737 to Hatch issued Oct. 16, 1973; 3,156,506 to H. B. Scheifele et al issued Nov. 10, 1964 and 4,085,984 to R. W. Cameron issued Apr. 25, 1978. These patents show bearings which have inner and outer races with a sharp radaii of curvatures in intimate contact with bearing stop shoulders. It has been found that these designs worked adequately in heavy duty axle assemblies. More specifically, these designs are acceptable for hubs and shafts made out of steel.

The present invention is directed to wheel assemblies which have hubs made of aluminum rather than of steel. The use of aluminum hubs reduces the weight of the vehicle thus permitting more economical operation thereof. It has been found, however, that using lightweight aluminum hubs in high stress situations has caused cracking of the hub in the area of the bearing stop shoulder. This stress cracking was not found in stronger, heavier steel hubs of similar design. The present invention is designed to reduce the stress concentration at the bearing stop shoulders on the aluminum hubs thereby making the use of aluminum hubs in heavy duty vehicles far more reliable.

U.S. Pat. No. 3,156,506 to H. B. Scheifele et al is typical of the prior art applications in which the bearings have sharp radaii on the corners of their inner and outer races which make close contact with the hub assembly and the shaft assembly. The main concern of the present invention is with the hub and, consequently, the outer race of the bearing. In order to use standard bearings, it has been found necessary to use a bearing spacer to allow a greater radius of curvature on the bearing stop shoulder of the hub. The bearing stop spacer is placed between the outer surface of the bearing and the inner surface of the bearing stop shoulder which provides a corner radius much larger than that of the standard bearing such as that shown in Scheifele et al.

SUMMARY OF THE INVENTION

It is an object of the invention to provide a wheel assembly including an aluminum hub which is free from any stress cracking problems.

It is a further object of this invention to provide a bearing spacer which reduces stresses in the area of the bearing stop shoulder of the hub.

It is still a further object of this invention to provide a bearing stop spacer which is relatively small in thickness and includes a large inner radius to reduce stresses in the bearing shoulder area of the hub.

It is a still further object of this invention to provide a lightweight wheel assembly which is highly reliable and results in more economical operation of the vehicle in which it is installed.

These and other objects of the invention are disclosed in a preferred embodiment of the invention which includes a wheel assembly having a hub rotatable about a spindle. The hub includes a bearing stop shoulder radially inwardly projecting from an inner circumferential surface of the hub. A bearing is mounted on an outer circumferential surface of the spindle and a bearing spacer is positioned between the stop shoulder and the bearing. The bearing spacer is comprised of an annular member having axially extending inner and outer cylindrical surfaces and radially extending end surfaces. One of the end surfaces extends radially outward of the inner cylindrical surface a radial distance less than the radial extent of the stop shoulder and is joined to the outer cylindrical surface by a surface spaced from the stop shoulder and the inner circumferential surface of the hub. This allows the bearing spacer to transmit thrust forces of the bearing to the bearing stop shoulder while allowing a large radius of the bearing stop shoulder to reduce stress therein.

These and other objects and advantages of the invention will become apparent from the following description of the accompanying drawings.

DESCRIPTION OF THE INVENTION

Figure 1:
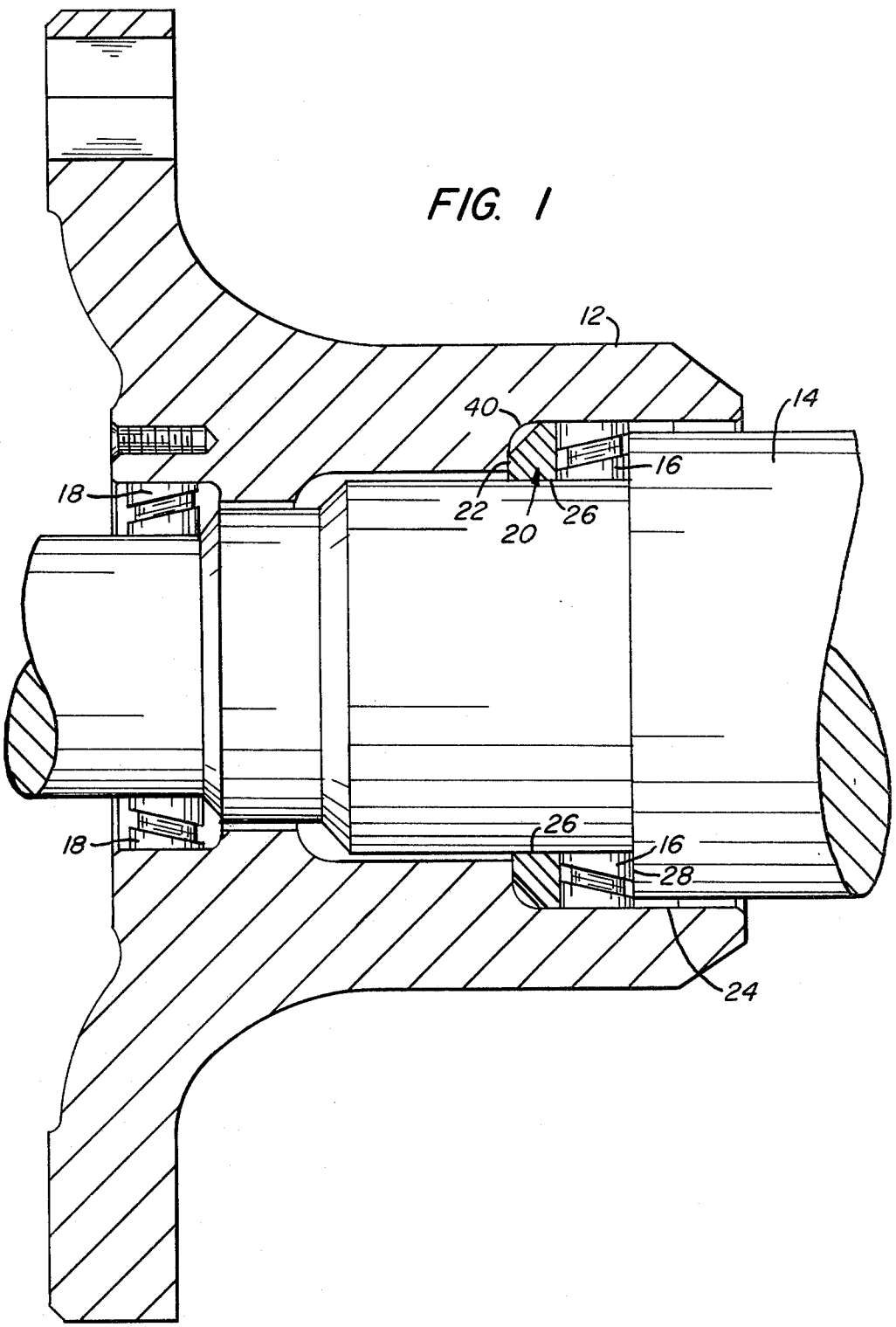
FIG. 1 is a cross sectional view of a wheel assembly including the present invention.

With reference to the drawings, there is shown in FIG. 1 a wheel assembly generally indicated as 10. The wheel assembly includes a hub 12 and a spindle 14. An inner bearing 16 and an outer bearing 18 are located between the spindle and the hub to allow the hub to freely rotate about the spindle during operation of the vehicle. A bearing spacer 20 is located intermediate the inner bearing 16 and a shoulder 22 of hub 12.

Figure 2:
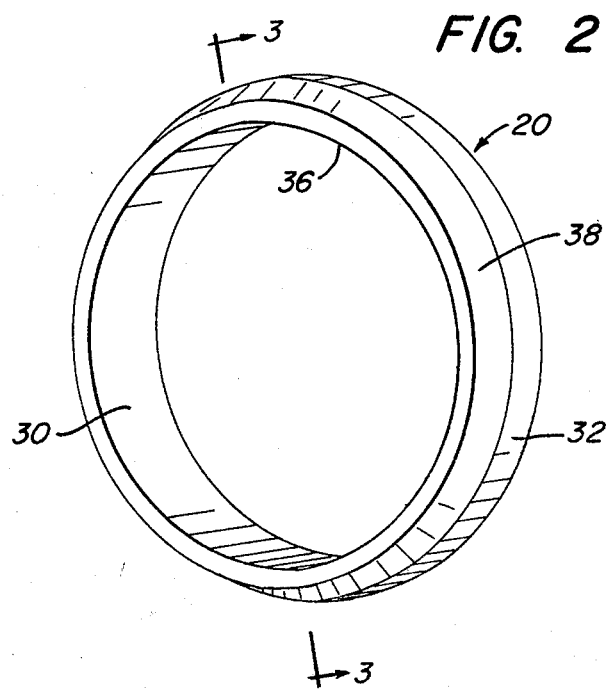
FIG. 2 is a perspective of the bearing spacer shown in FIG. 1.
Figure 3:
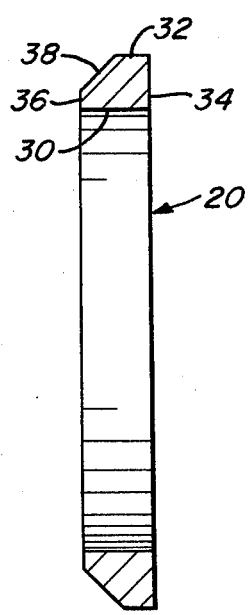
FIG. 3 is a cross-sectional view of the bearing spacer shown in FIG. 2.

The bearing stop shoulder 22 radially inwardly projects from an inner circumferential surface 24 of the hub 12. The bearing 16 is mounted on an outer circumferential surface 26 of the spindle 14 and is positioned between the spindle surface 28 and the bearing stop shoulder 22 by the bearing spacer 20. As can best be seen in FIGS. 2 and 3, the bearing spacer 20 is comprised of an annular member having axially extending inner and outer cylindrical surfaces 30 and 32 respectively. The bearing spacer 20 has radially extending inner and outer end surfaces 34 and 36 respectively. End surface 36 extends radially outward from the inner cylindrical surface 30 a radial distance less than the radial extent of the stop shoulder 22 and is joined to the outer cylindrical surface 32 by a surface 38 which in the wheel assembly of FIG. 1 is spaced from the stop shoulder 22 and the inner circumferential surface 24 of the hub 12.

In the preferred embodiment the surface 38 extends axially inwardly at an angle of 45 degrees with respect to the center line of the spindle 14. The spacer 20 is designed to permit a relatively large radius 40 and thereby avoid a small corner where the stop shoulder 22 joins the surface 24 of hub 12. Other angles may be used for surface 38 as long as the surface 38 clears the large radius 40 of shoulder 22. A step may also be used between surface 36 and surface 32 but the angled surface 38 is preferred.

As stated above, in the prior art wheel hubs fatigue cracks have originated in the area of the corner where the shoulder 22 joins surface 24. The small radius previously provided at the bearing cup shoulder on conventional hubs is required by the standard design of bearings used in the automotive field which utilize the sharp corners for engagement with the hub. These sharp corners have been satisfactory when installed adjacent the bearing stop shoulder in hubs made of steel. However, in hubs made of aluminum, cracking, as described above, has occurred. Fatigue cracks are minimized with the use of a bearing spacer as described herein because the bearing spacer allows the rotating hub to have a generous shoulder radius as shown at 40.

Stress fractures of the type described above occur in automotive applications because the hubs rotate on fixed spindles and are susceptible to fatigue fractures because they experience a complete load reversal every revolution. The substantial loading on the bearing and, consequently, the bearing stop shoulder are thrust loads which occur during vehicle operations. Fatigue fractures which resulted from stress concentrations in the area of the small radius previously used at the base of the bearing stop shoulder can be minimized by the use of the cup spacer of the present invention. The bearing spacer 20 moves the standard bearing cup, which has a sharp radius, away from the shoulder 22 and the angled surface 38 allows a generous shoulder radius to be machined in the hub.

The invention described thus provides an improved vehicle wheel assembly utilizing an aluminum hub which is lighter and far less suseptible to stress failure than those of the prior art.

I claim:

1. In a land vehicle a wheel assembly including an aluminum hub rotatable about a spindle, said hub including a bearing stop shoulder projecting radially inwardly from an inner circumferential surface of said hub, a bearing mounted on an outer circumferential surface of said spindle and a bearing spacer intermediate said stop shoulder and said bearing, said bearing spacer comprising an annular member having axially extending inner and outer cylindrical surfaces and radially extending end surfaces, one of said end surfaces extending radially outward from said inner cylindrical surface a radial distance less than the radial extent of said stop shoulder and being joined to said outer cylindrical surface by a surface spaced from said stop shoulder and said inner circumferential surface of said hub whereby said bearing spacer transmits thrust forces on said bearing to said bearing stop shoulder while allowing a large radius on the bearing stop shoulder to reduce undesirable stress concentrations therein.

2. In a land vehicle an improved wheel assembly which includes an aluminum hub rotatable about a spindle, said hub including a bearing stop shoulder projecting radially inwardly from an inner circumferential surface of said hub and, a bearing mounted on an outer circumferential surface of said spindle wherein the improvement comprises a bearing spacer intermediate said stop shoulder and said bearing, said bearing spacer having axially extending inner and outer cylindrical surfaces and radially extending end surfaces, one of said end surfaces extending radially outward from said inner cylindrical surface a radial distance less than the radial extent of said stop shoulder and being joined to said outer cylindrical surface by a surface spaced from said stop shoulder and said inner circumferential surface of said hub whereby said bearing spacer transmits thrust forces on said bearing to said bearing stop shoulder to reduce undesirable stress concentrations therein.

3. A bearing spacer as set forth in claim 2, wherein said one of said end surfaces is joined to said outer cylindrical surface by a surface which is inclined 45 degrees with the center line of said spindle.

* * * * *

UNITED STATES PATENT AND TRADEMARK OFFICE
CERTIFICATE OF CORRECTION

PATENT NO. : 4,244,631
DATED : January 13, 1981
INVENTOR(S) : Patrick M. Cadaret It is certified that error appears in the above—identified patent and that said Letters Patent is hereby corrected as shown below:

Column 4, Line 34  After "shoulder" insert --while allowing a large radius on the bearing stop shoulder--

Signed and Sealed this

Second Day of March 1982

[SEAL]

Attest:

GERALD J. MOSSINGHOFF

*Attesting Officer*  *Commissioner of Patents and Trademarks*